March 24, 1925.

Re. 16,030

R. K. WINNING

COMBINATION SWITCH

Original Filed Sept. 29, 1919 2 Sheets-Sheet 1

INVENTOR.
Robert K. Winning
BY Erwin Wheeler & Wooster
ATTORNEYS.

March 24, 1925.

Re. 16,030

R. K. WINNING

COMBINATION SWITCH

Original Filed Sept. 29, 1919 2 Sheets-Sheet 2

INVENTOR.

Robert K. Winning

BY Erwin Wheeler & Woolard

ATTORNEYS.

Reissued Mar. 24, 1925.

Re. 16,030

UNITED STATES PATENT OFFICE.

ROBERT K. WINNING, OF WAUWATOSA, WISCONSIN, ASSIGNOR TO CLUM MFG. CO., OF MILWAUKEE, WISCONSIN, A CORPORATION OF WISCONSIN.

COMBINATION SWITCH.

Original No. 1,441,618, dated January 9, 1923, Serial No. 327,126, filed September 29, 1919. Application for reissue filed September 1, 1924. Serial No. 735,225.

*To all whom it may concern:*

Be it known that I, ROBERT K. WINNING, a citizen of the United States, residing at Wauwatosa, in the county of Milwaukee and State of Wisconsin, have invented new and useful Improvements in Combination Switches, of which the following is a specification.

This invention relates to combination switches more particularly although not solely adapted for controlling automobile electric ignition and lighting circuits.

In automobile and other self propelled vehicles switches are provided for controlling the ignition and lighting circuits thereof and it is customary to include a locking means in the switch to prevent the surreptitious use of the vehicles. It is desirable to combine both the ignition and the lighting switch in a unitary structure to reduce cost and size. Switches now in use are usually combined and are provided with means for jointly locking both the ignition and all of the lighting circuits or for only locking the ignition circuit. The switches having the joint locking means are undesirable in that when locked the tail and dim lamps cannot be turned on or off without unlocking the switch, and the switch with only the ignition lock does not prevent the unauthorized turning on of the head lamps.

It is one of the objects of the present invention to provide a combination which includes the before mentioned and many other desirable features, and eliminates the undesirable ones.

A further object of the invention is to provide a combination switch having means for jointly locking the ignition and the head lamps circuits so that the other lamps may be turned on or off without reference to the locking means.

A further object of the invention is to provide a combination switch in which one of the movable switch elements can be locked against movement and other switch element locked against its complete movement by a single key.

A further object of the invention is to provide a combination switch so constructed that even though head of movable lighting switch element be broken off it would be impossible to remove or open the lock without the key.

A further object of the invention is to provide a combination switch in which the movable switch elements are of the self centering floating type and form a positive contact with all of the terminal members and an automatic means for indicating when the contacts are in engagement and yieldingly holding them in engagement with each other.

A further object of the invention is to provide a combination switch in which the movable parts are assembled and fastened together from the inside of the switch casing to prevent the removal of the parts while the switch is mounted in operable position on the instrument board of an automobile.

A further object of the invention is to provide a combination switch in which the movable lighting switch element also serves as a housing for the lock cylinder and barrel.

A further object of the invention is to provide a combination switch in which the lighting circuit switch element is of annular form and serves as a guide for the movable ignition switch element which is of disk form.

A further object of the invention is to provide a combination switch in which the terminal adapted to be connected to the ignition coil is grounded when the movable ignition switch element is in off position, thus making it impossible to operate engine by connecting wires outside of switch as the other terminal of the ignition coil is connected to ground.

A further object of the invention is to provide a combination switch in which the spring means for holding the movable switch elements yieldingly in position also serve to hold the rear portion of the switch casing removably in locked position.

A further object of the invention is to provide a combination switch in which all of the spring members are insulated from all current carrying parts of the switch, thus eliminating possible softening of the springs due to heat from the current.

A further object of the invention is to provide a combination switch in which the parts are so formed as to be easily taken apart or assembled and are also arranged so as to positively prevent incorrect assembling of the parts.

A further object of the invention is to provide a combination switch in which the parts are of very simple construction, strong and durable and well adapted for the purpose described.

With the above and other objects in view, the invention consists of the improved combination switch and its parts and combinations as set forth in the claims and all equivalents thereof.

In the accompanying drawings in which the same reference characters indicate the same parts in all of the views.

Figure 13:
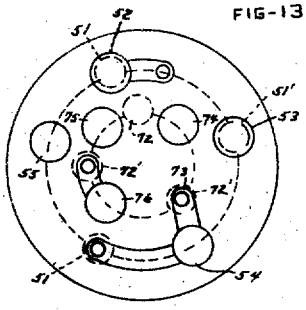
Figure 14:
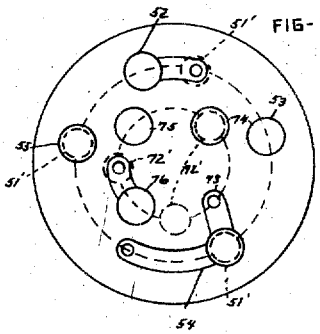
Figure 5:
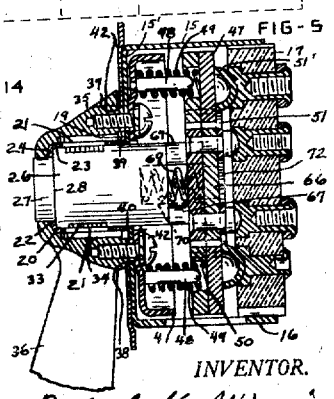
Fig. 5 is a vertical sectional detail view of the switch taken on line 5—5, as indicated in Fig. 6.

Fig. 13 is a diagrammatic view of the combination switch with the ignition member indicated in circuit with the battery and the magneto cut out, the lighting member being indicated in circuit with the battery and with the tail and dim lamps; and Fig. 14 is another diagrammatic view of the combination switch with the ignition member indicated in circuit with the magneto and the induction coil, and the lighting member being indicated in circuit with the head and tail lamps and with the battery.

Figure 1:
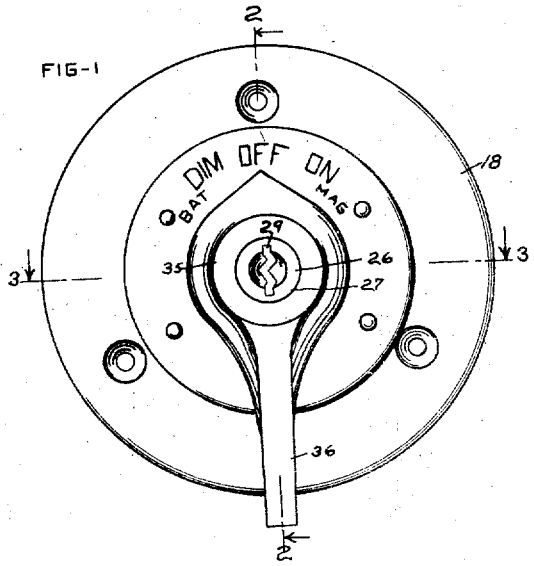
Fig. 1 is a front view of the improved combination switch.
Figure 2:
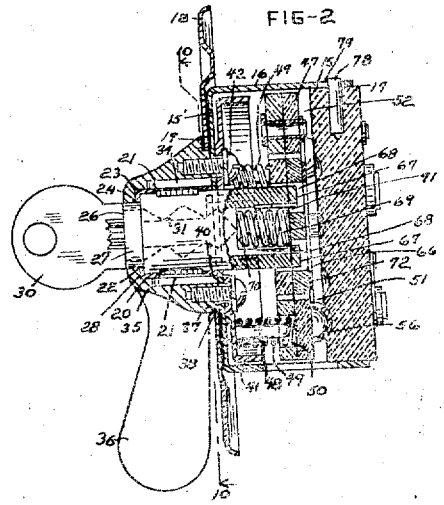
Fig. 2 is a vertical sectional view thereof, taken on line 2—2 of Fig. 1.
Figure 7:
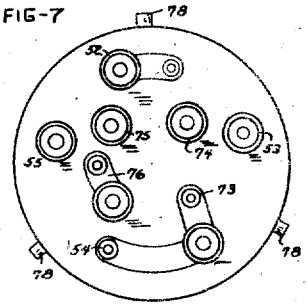
Fig. 7 is a rear view of the contact terminal plate.
Figure 6:
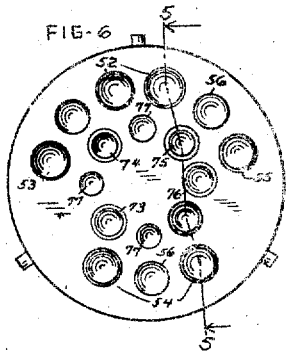
Fig. 6 is an inner face view of the contact terminal plate of the casing.
Figure 8:
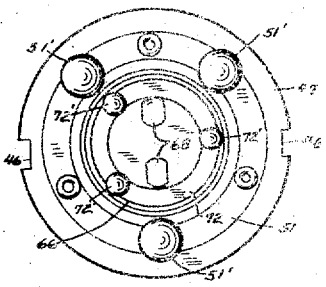
Fig. 8 is a rear view of the rotatable lighting contact ring and the ignition contact member.
Figure 9:
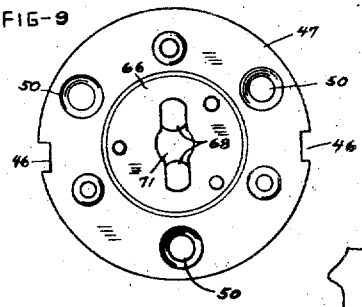
Fig. 9 is a front or inner view of the lighting contact ring and the ignition contact member.
Figure 3:
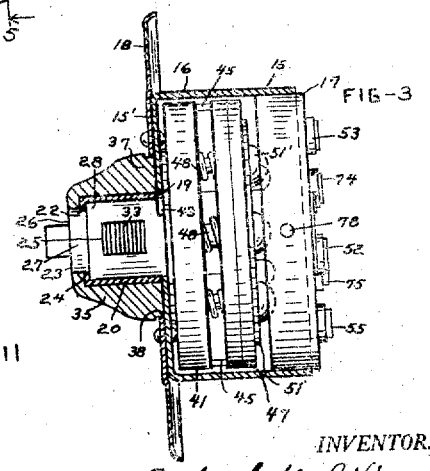
Fig. 3 is a horizontal sectional view taken on line 3—3 of Fig. 1, the inner parts of the switch being shown in full line.
Figure 11:
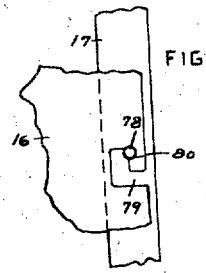
Fig. 11 is a detail side view showing the manner of removably securing the contact terminal plate of the casing.

Referring to the drawings the numeral 15 indicates the casing or support, 16 the tubular extension or barrel thereof, and 17 the terminal insulating plate which forms the rear cover for the casing. The casing is of cup like shape with its bottom portion 15′ forming the front end of the casing and on which end a dial plate 18 is rigidly mounted. The center portion of the casing is provided with an opening 19 to receive the inner open end of the extension or barrel 20 which is also rigidly connected thereto. The extension barrel 20 is formed of comparatively thin metal and is provided with elongated peripheral locking slots 21 and an outer end opening 22 of less diameter than the bore 23 of the extension to form an annular shoulder 24. The locking slots 21, of which there are preferably two, are spaced equi-distant circumferentially from each other and are of a width corresponding to the width of the transversely extending tumbler slot 25 of the lock cylinder 26 which is revolubly mounted in the extension barrel 20. The lock cylinder 26 is formed with a reduced forward end portion 27 which projects through the reduced outer end opening 22 of the extension barrel, and the shoulder 28 formed by said reduced portion abuts against the shoulder 24 of the barrel and properly positions the two parts with relation to each other. A key slot 29 of irregular shape transversely extends longitudinally through the central portion of the lock cylinder and intersects the transverse tumbler slot 25. A key 30 having its two opposite edges 31 of reverse irregular shape and its width approximately the same throughout its tumbler engaging portions, is shaped or corrugated transversely to fit the key slot and is adapted to extend through the elongated openings 32 of the flat tumblers 33 reciprocally mounted in the lock cylinder slot when said key is inserted in the key slot. The flat tumblers extend transversely in and closely fit the cylinder slot and are all of a length corresponding to the diameter of the lock cylinder so that when their outer end edge portions are alined and flush with the periphery of the lock cylinder, the cylinder may be freely turned within the extension barrel of the casing by the key. While all of the elongated medial openings 32 of the tumblers are of the same length they vary in distances from the opposite ends of the tumblers and form an irregular opening or slot which in shape conforms approximately to the edge contour of the portion of the key engaged by the tumblers when said tumblers are in alined unlocked position as indicated in Fig. 2.

While the tumblers are arranged to fit the particular key shown, it is obvious that the arrangement of the tumblers may be changed or the distances between the medial openings may be varied to fit differently shaped keys so that any two locks cannot be controlled by the same key. When the key is withdrawn from the lock the tumbler openings will be in alined position with respect to each other and the outer ends of the tumblers will be out of alinement with each other and project through the locking slots 21 of the barrel 20 and lock the cylinder to the barrel. The opposite ends of the tumblers are also adapted to extend through the slots of the extension barrel and enter the segmental locking recesses 34 of the hub portion 35 of the lighting switch lever 36. The said hub portion 35 surrounds the barrel and the outer projecting end of the cylinder and bears against the face of the dial with an annular portion 37 of the hub extending into the center opening 38 of the dial 18. The segmental recesses 34 are so positioned and are of a circumferential length as to register with the locking slots of the tubular extension 20 when the lighting switch lever is turned to either "dim" or "off", position so that when the combination switch is locked, the lighting switch lever may be freely turned to either "dim" or "off" position but is locked against being turned to "head" light position. The segmental recesses may be omitted when it is desired to eliminate locking the lighting switch member in any position.

The hub portion of the lighting switch lever is maintained in position against endwise movement on the extension barrel by means of segmental extensions 39 formed on the inner face of the hub which extend through segmental openings 40 formed in the dial and the bottom portion 15′ of the casing and bear against the outer face of a cup-shaped lighting ring guide 41. Screws 42 extending through the guide 41 and the segmental openings 40 and threaded into the segmental extensions 39 secure the parts together. The segmental openings 40 are of greater length than the segmental extensions 39 as indicated in Fig. 4 to permit the lighting switch lever being moved to its three positions of rest.

The peripheral locking slots 21 of the extension barrel are positioned diametrically opposite each other and are in alinement with the off position of both switch members so that when the key is turned to move the ignition switch member to either battery or magneto position the tumbler slot of the cylinder will be out of register with the locking slots of the fixed extension and the tumblers will be nonreciprocally confined within the periphery of the cylinder and lock the key against withdrawal while in "on" position.

Figure 4:
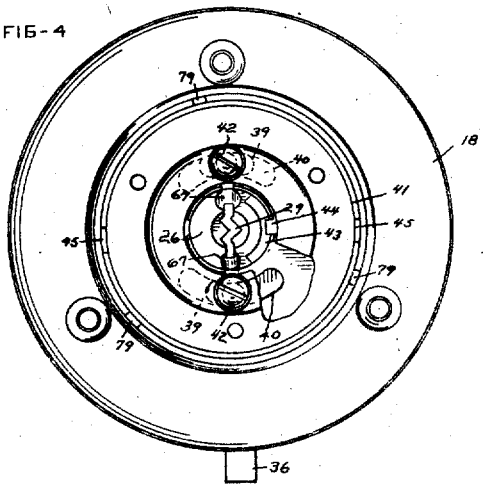
Fig. 4 is a rear view of the switch, parts removed to show interior construction.
Figure 10:
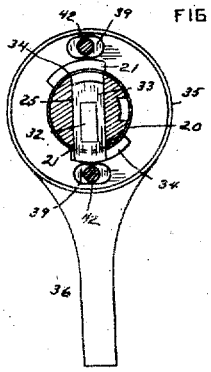
Fig. 10 is a sectional detail view of the lighting contact ring lever taken on line 10—10 of Fig. 2.

One side portion of the lock cylinder within the casing is formed with a segmental recess 43 into which extends the inner end of a stop finger 44 forming part of the bottom portion of the casing to limit the movement of the lock cylinder in the casing as clearly shown in Fig. 4.

The lighting contact ring guide 41 is provided with opposite outwardly projecting guide fingers 45 which extend into the peripheral guide recesses 46 of the floating lighting contact ring member 47 and guide said member axially while turning from one position to another. Said guide fingers 45 are not directly diametrically opposite each other but are offset a few degrees and the guide recesses of the guide ring member 47 are also correspondingly offset to make it impossible to incorrectly position the ring on the guide fingers. The ring guide is also provided with three outwardly extending guide pins 48 for receiving coiled springs 49 which surround the pins and are interposed between the lighting contact ring guide 41 and the lighting contact ring member 47. The outer ends of the springs and the guide pins extend into recesses or sockets 50 formed in the ring member 47.

It will be noted that the ring member 47 is made in two parts, and comprises two complementary sheets of dielectric material in face contact. The sockets 50 are constructed by punching holes completely through one of the sheets of dielectric material above referred to, and forming the other sheet of such material to present an imperforate portion to each such hole. Thereby the sockets are economically constructed with accuracy to the desired depth, and I prefer the construction illustrated because of the fact that the ring member 47 may be more economically manufactured in the manner described than would be possible if it were attempted to bore the sockets 50 to the desired depth in a single sheet of dielectric material.

The guide pins 48 while apparently spaced equi-distantly apart circumferentially are offset a few degrees and the sockets 50 of the ring member 47 are likewise offset to prevent incorrect assembly of the parts.

Figure 12:
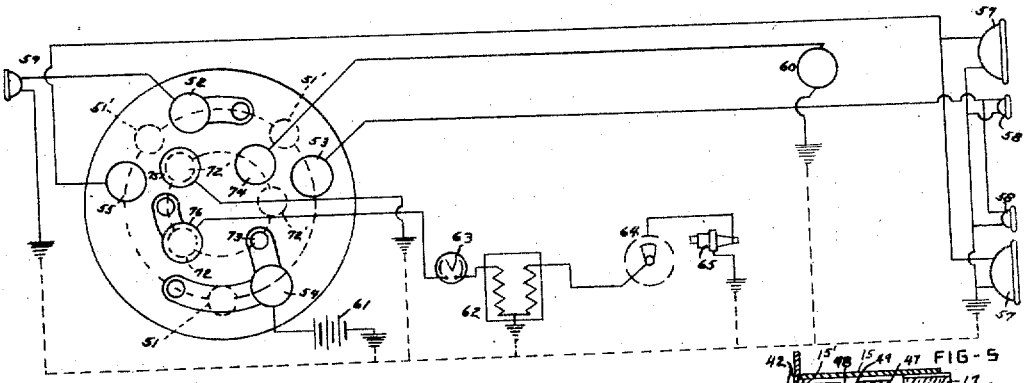
Fig. 12 is a diagrammatic view of the electric connections of an automobile showing the manner of connecting the switch in the circuit and indicating the ignition member as in off position and the induction coil as grounded, the lighting member also being indicated as in its off position.

The lighting contact ring member 47 is formed of insulating material and on its outer face is mounted a metal contact ring 51 having three outwardly embossed rounded or hemispherical contact portions 51′ which are adapted to engage the rounded end recesses of fixed lighting contact terminals 52, 53, 54, and 55 mounted in the terminal insulating plate 17. The springs 49 pressing on the contact ring at three points approximately equi-distantly spaced, permits the contact ring to float or move in any direction and the rounded portions 51′ to automatically center, in the terminal recesses and form a positive electrical contact with the terminals as well as to indicate with a positive snap the different positions of rest of the ring. In the same circumferential line and between the contact terminals, the terminal plate 17 is provided with three rounded recesses 56 to receive the rounded contact portions 51′ when the lighting contact ring is in off position. The lighting terminals are adapted to be connected to a one-wire lighting circuit in the manner shown in Fig. 12 or in any other lighting circuit combination desired. In said Fig. 12 the head lamps are indicated by 57, the dim lamps by 58, and the tail lamp by 59. In said circuit a generator 60 and a battery 61 supply the current. An ignition coil 62, a circuit breaker 63, a distributor 64, and a spark plug 65 are also diagrammatically indicated.

The combination of lamps or the circuits shown may be changed in any manner desired without departing from the spirit and scope of the invention.

A floating ignition switch member 66 positioned within the bore of the lighting contact ring 47 is removably connected to the lock cylinder 26 by pin portions 67 which project from the inner end of the said cylinder and loosely enter openings 68 provided in the ignition switch member. Said pin portions are of different diameter from each other and the diameters of the openings 68 also vary to correspond to prevent incorrect positioning of the switch member on the pin portions. A coiled spring 69 interposed between the lock cylinder and the ignition switch member and between the pin portions 67 holds the switch member yieldingly in position. Both the lock cylinder and the ignition switch member are provided with central recesses 70 and 71 to receive the ends of the spring 69 and hold the spring in position.

The ignition switch member is also formed of insulating material and on its outer face is mounted a metal contact ring 72 having three outwardly projecting rounded or hemispherical contact portions 72′ which are adapted to engage the rounded end recesses of fixed ignition contact terminals 73, 74, 75, and 76. Said ignition contact terminals are concentrically mounted in the terminal insulating plate 17 within the circle of lighting terminals. The terminal plate is also provided with three position recessed portions 77 to receive the rounded ignition contact portions 72′ when some of said contact portions are in off position. While in Fig. 12 the contact terminal 73 is shown as connected to the battery and terminal 54, the contact terminal 74 connected to the generator 60, the contact terminal 75 connected to ground and the contact terminal 76 connected to the coil 62, it is to be understood that the ignition terminals may be included in other circuit arrangements without departing from the spirit and scope of the invention. Said plate terminals are threaded for receiving binding screws (not shown) in connecting the switch to the wires of a circuit.

The terminal plate 17 is provided with three unequally spaced pins 78 projecting radially from the periphery of the plate which enter correspondingly spaced bayonet slots 79 formed in the casing 15 to permit the convenient removal of the plate to gain access to the interior of the casing. The inner ends of the bayonet slots are recessed as indicated by the numeral 80 to releasably lock the plate in closed position when pressed outwardly by the coiled springs 48 and 69. The unequal spacing of the radial pins and slots prevent the incorrect positioning of the plate in the casing.

From the foregoing description it will be seen that the improved combination switch is of very simple construction and that the parts cannot be incorrectly assembled.

What I claim as my invention is:

1. Two switch elements, and means for locking one of said elements against movement and the other only against a part of its full movement, said part movement permitting the partially locked element to be moved to an "on" or an "off" position.

2. Two switch elements, means for locking one of said elements against movement and the other only against a part of its full movement, said part movement permitting the partially locked element to be moved to an "on" or an "off" position, and a removable member controlling the locking means and for moving one of the switch elements.

3. A combination switch, comprising a casing, a plurality of switch elements mounted thereon for controlling a plurality of electrical circuits, means for locking one of the switch elements against movement and locking another switch element against a part of its full movement, said part movement permitting the partially locked element to be moved to an "on" or an "off" position, and a removable key controlling the locking means.

4. A combination switch, comprising a casing, a plurality of switch elements mounted thereon one of said switch elements having at least three positions of rest, means for locking one of the switch elements against movement and for locking the other switch element against being moved to one of its three positions of rest, and a removable key controlling the locking means.

5. A combination switch, comprising a casing, a plurality of floating rotary switch elements within the casing, a non-removable means for moving one of the switch elements to either one of its three positions of rest, means for locking one of the switch elements against rotation and for locking the other switch element against being rotated to one of its positions of rest, and a removable key controlling the locking means and for turning one of the switch elements.

6. A combination switch, comprising a support, a plurality of floating rotary switch elements carried thereby, one of said switch elements having three positions of rest, a non-removable means for moving the last mentioned switch element to either one of its positions of rest, means for locking said last mentioned switch element against movement to one of its positions of rest and for locking the other switch element against movement, and a removable key controlling the locking means and for moving said other switch element to its positions of rest.

7. A combination switch, comprising a casing, two lockable floating rotary switch elements mounted therein, and a removable key, one of said switch elements being actuated by the removable key which controls the locking of the other switch element against movement to one of its positions of rest.

8. A combination switch, comprising a casing, a plurality of floating rotary switch elements mounted therein, and a removable key therefor, one of said switch elements being actuated by said key which controls the locking of the other switch element against movement to one of its positions of rest and being removable from the switch only when the key actuated switch is in off position.

9. A combination switch, comprising a casing, a switch lever mounted thereon and having a lock mechanism, a contact plate carried by the casing and having a plurality of terminal contacts, a floating ring positioned within the casing and provided with a plurality of contacts for bridging some of the terminal contacts, said ring being rotated by the switch lever, a floating switch member positioned within the casing and provided with a plurality of contacts projecting in the same direction as the axis of the switch for bridging some of terminal contacts, said floating switch member being rotated by the lock mechanism, and a removable key engageable with and controlling the lock mechanism.

10. A combination switch mechanism including an ignition and a lighting switch, said lighting switch including a contact movable between an inoperative and a plurality of operative circuit closing positions, a removable actuating member for said ignition switch, and means controlled by said member for preventing movement of said lighting switch into one of its operating positions while permitting it to move to another of its operating positions.

11. The combination of two switches including movable contact members normally adapted for free oscillation into and out of circuit closing positions, and operating mechanism including a removable key, one of said switches being wholly inoperative when the key is removed and the other of said switches being dependent upon the key for oscillation to one circuit closing position and movable independently of the key to another circuit closing position.

12. A combination switch, comprising a casing, a terminal plate carried thereby and having a plurality of terminal contacts, a floating ring positioned within the casing and having a plurality of contacts for bridging some of the terminal contacts, a lever journaled in to the casing and engaging the ring, coiled springs bearing against the ring, a floating switch member positioned within the ring and having a plurality of contacts for bridging some of the terminal contacts, a locking mechanism carried by the casing for locking and rotating the floating switch member, a coiled spring interposed between the locking mechanism and the floating switch member, and a removable key controlling the locking mechanism.

13. A combination switch, comprising a casing, a terminal plate carried thereby and having a plurality of terminal contacts, a lever fulcrumed to the casing, a ring guide within the casing and connected to the lever, a floating ring having a plurality of contacts for bridging some of the terminal contacts, coiled springs interposed between the ring guide and the floating ring, a floating switch member positioned within the ring and having a plurality of contacts for bridging some of the terminal contacts, a locking mechanism carried by the casing for locking and rotating the switch member, a coiled spring interposed between the locking mechanism and the floating switch member, and a removable key controlling the locking mechanism.

14. A combination switch, comprising a casing, two oscillating switch elements mounted therein in concentric relation and movable independently of each other, a non-removable means for oscillating one of the switch elements, a removable means for oscillating the other switch element, and a lock mechanism for the last mentioned switch element which is controlled by the removable means and which mechanism also controls the other switch element, said switch elements having floating connections with their respective oscillating means.

15. A combination switch, comprising a casing having a tubular extension provided with a locking opening, a terminal plate carried thereby and having a plurality of terminal contacts, a lever having a hub portion journalled on the tubular extension, a ring guide within the casing and connected to the lever and having guide fingers, a floating ring positioned within the casing and having recesses which are entered by the guide fingers, said ring having a plurality of contacts for bridging some of the terminal contacts, coiled springs interposed between the ring guide and the floating ring for yieldingly holding the contacts in engagement, a floating switch member within the ring and having a plurality of contacts for bridging some of the terminal contacts and also having pin recesses, there being a rounded recess and projection engagement between said contacts, a locking mechanism within the lever hub having a portion which enters the tubular extension opening, said locking mechanism also having projecting pin portions which enter the pin recesses of the floating switch member, a coiled spring interposed between the locking mechanism and the floating switch member, and a removable key controlling the locking mechanism and for turning the floating switch member.

16. A combination switch, comprising a casing having a tubular extension provided with a locking opening, an insulating terminal plate removably carried thereby and having a plurality of terminal contacts provided with recessed ends, a lever having a hub portion journalled on the tubular extension and having a locking recess, a ring guide within the casing and connected to the lever and having opposite guide fingers, a floating insulating ring within the casing and having opposite recesses which are loosely entered by the guide fingers, said fingers and recesses being unequally spaced to prevent incorrect assembly, said ring also having a plurality of rounded contacts for entering the recesses of and bridging some of the terminal contacts, coil springs interposed between the ring guide and the floating ring for yieldingly holding the contacts in engagement, a floating switch member within the ring and having a plurality of rounded contacts for entering the recesses of some of the terminal contacts and bridging the same and also having pin recesses of unequal size, a locking mechanism within the tubular extension and having locking members which when in locking position extend through the locking opening of the tubular extension and into the locking recess of the lever hub, said locking mechanism also having outwardly extending guide pins of different diameters which enter the pin recesses of the floating switch member, a coiled spring interposed between the locking mechanism and the floating switch member, and a removable key controlling the locking mechanism and for turning the floating switch member.

17. A combination switch, comprising a casing having a tubular extension provided with a locking opening, an insulating terminal plate carried thereby and having a plurality of terminal contacts provided with recessed ends, said plate having a pin and bayonet slot connection with said casing, a lever having a hub portion journalled on the tubular extension and having a locking recess, a ring guide within the casing and connected to the lever and having opposite guide fingers, a floating insulating ring within the casing and having opposite recesses which are loosely entered by the guide fingers, said fingers and recesses being unequally spaced to prevent incorrect assembly, said ring also having a plurality of rounded contacts for entering the recesses of and bridging some of the terminal contacts, coiled springs interposed between the ring guide and the floating ring for yieldingly holding the contacts in engagement, a floating switch member within the ring and having a plurality of rounded contacts for entering the recesses of some of the terminal contacts and bridging the same and also having pin recesses of unequal size, a locking mechanism within the tubular extension and having locking members which when in locking position extend through the locking opening of the tubular extension and into the locking recess of the lever hub, said locking mechanism also having outwardly extending guide pins of different diameters which enter the pin recesses of the floating switch member, a coiled spring interposed between the locking mechanism and the floating switch member, and a removable key controlling the locking mechanism and for turning the floating switch member.

18. A switch element comprising a ring formed of insulating material and having a metal contact ring mounted thereon and provided with a plurality of raised contact portions projecting axially away from said ring of insulating material, whereby to be adapted for engagement with terminals presented to the face of said contact ring.

19. The combination of two switches including movable contact members normally adapted for free oscillation, a removable key, and a lock controlled by said key and adapted to act positively upon one of said members wholly to restrict its movement, said lock including tumblers adapted to be projected into engagement with the other of said members, said last mentioned member being provided with a tumbler receiving recess of a materially greater transverse dimension than the tumbler receivable therein, whereby to permit a limited degree of movement to said last mentioned member when said lock is in operation.

20. In a switch mechanism, an oscillatory contact member extending about an unobstructed central area and comprising a strip conductor provided at intervals with hemispherically embossed contact portions extending substantially to a common plane and substantially equi-distant from a common center within said area, said conductor extending circumferentially between said portions.

21. In a switch mechanism, an oscillatory contact member extending about an unobstructed central area and comprising a strip conductor having circumferentially spaced raised contact portions, together with an actuating device connected with said conductor intermediate said portions.

22. In a switch mechanism, the combination with a plurality of relatively stationary terminals extending in arcuate series; of a contactor member having an open central area and comprising a strip conductor provided at intervals with convexly embossed portions lying substantially in a common plane and at a distance from a common center corresponding substantially to the radius of said series of terminals, said conductor extending about said area to connect said portions successively; together with means for supporting said contactor member for oscillation co-axially with said center and in operative relation to said terminals.

23. A combination switch comprising a single terminal head provided with terminals in a plurality of arcuate series, a plurality of concentric and independently oscillatable floating switch elements resiliently confined for operative engagement with the terminals of said head, a removable key for operating one of said elements and a handle loosely connected with another element, whereby to permit a limited independent movement of said last mentioned element to equalize the pressure on the terminals engaged by it.

24. In a combination electrical switch, two oscillatable concentric switch devices each including a pair of members and interposed spring means pressing said members oppositely, one member of each such pair comprising a conducting contact element, together with a casing having opposed faces confining the members of each such pair, said casing being provided with relatively stationary contacts disposed respectively in the paths of oscillation of said elements.

25. In a combination electrical switch, two oscillatable concentric switch devices each including a pair of members and interposed spring means pressing said members oppositely, one member of each such pair comprising a conducting contact element, together with a casing having opposed faces confining the members of each such pair, said casing being provided with relatively stationary contacts complementary to said elements, and means for insulating the contact elements of said devices from each other.

26. In an electrical switch, the combination with a support provided with terminals in arcuate series, of a switch device providing a central opening and comprising an actuating annulus guided for oscillation, a floating contact member extending circumferentially about said opening and comprising a strip conductor provided with circumferentially spaced axially embossed contact portions, spring means disposed about said opening and arranged to support said contact member from said annulus, and guiding means spaced about said opening and loosely connecting said annulus with said contact member for simultaneous oscillation while permitting self adjusting movements of said floating member.

27. In a device of the character described, the combination with a terminal head provided with concentric series of terminal contacts, of a pair of concentric switch devices each including insulating members and contact members, springs acting upon one of said members in a direction to urge said contact members in the direction of the terminal contacts of said head, said insulating members being disposed substantially in a common plane and having closely adjacent margins, whereby to guide each other for rotation and mutually to insulate said contact members each from the other.

28. In a device of the character described, the combination with a casing providing relatively fixed terminals, of a rotary switch device confined within said casing and including a pair of members, and interposed springs urging said members apart, one of said members comprising complementary dielectric elements, one of which is provided with holes and the other of which presents imperforate portions to such holes, said springs being received in the holes of the first mentioned element and abutting the second mentioned element.

29. A switch including the combination with a terminal head having relatively stationary terminal contacts; of a ring positioned for rotation with respect to said head; a movable contactor associated with said ring and comprising a strip conductor in substantial parallelism with said ring and provided at intervals with axially embossed portions spaced circumferentially with reference to said ring, said conductor extending about said ring from one of said embossed portions to another; together with springs spaced about the circumference of said ring and operatively connected to act in a direction to press said contactor member in the direction of said head.

30. A combination switch comprising a terminal head providing relatively stationary terminal contacts, a floating ring confined adjacent said head and provided with a plurality of contacts adapted to co-operate with those of said head for circuit closing purposes, a lever, means supporting said lever for rotation with respect to said head, and means loosely connecting said lever with said ring and adapted to transmit to said ring the rotative movement of said lever without interference with self adjusting movement of the ring and its contacts, together with a second floating switch member disposed within said ring and a second series of terminal contacts on said head operatively arranged for interaction with said second switch member.

31. A switch including the combination with a casing having front and rear faces, a switch lever having an annular hub mounted for oscillation with respect to the front face of said casing and terminals on the rear face of said casing; of a centrally open switch device loosely connected with said lever to float within said casing and including a strip contact member extending circumferentially about the opening in a plane to which the axis of said casing is substantially normal and provided at spaced points with portions embossed in the direction of the rear face of said casing and disposed operatively for interaction with the terminals of said last mentioned face, and compression springs spaced circumferentially and operatively disposed to press said contact member in the direction of said terminals.

32. A combination switch including a casing having front and rear faces, a switch lever having an annular hub secured to the front face of said casing for oscillation with respect thereto, terminals on the rear face of said casing, an annular switch device between said faces spring-pressed in the direction of said terminals, said device including means loosely connecting it with said lever, a second switch mounted within said annular switch device, a terminal on the rear face of said casing for said second device, and means extending through the annular hub of said lever for the operation of said second switch device.

33. A combination switch including a casing having front and rear faces, a switch lever having an annular hub secured to the front face of said casing for oscillation with respect thereto, terminals on the rear face of said casing, an annular switch device within said casing spring-pressed in the direction of said terminals and loosely connected with said lever, a second switch device within said annular switch device, a terminal for said second switch device upon the rear face of said casing, a spring normally pressing said second switch device in the direction of said last mentioned terminal, and a removable key for the operation of said second switch device and ward means restricting to a selected key the operation of said second device.

34. In a switch, the combination of a terminal head providing concentric series of terminals; an inner switch including an oscillatory movable contactor operatively supported with respect to the inner series of terminals; and an outer switch including a manually operable part with an annular hub through which said inner switch is operated, an actuating member extending circumferentially about said inner switch and connected for rotation with said part; a second member axially spaced from said first member in floating connection for rotation therewith and comprising a second contactor in substantially the plane of said first mentioned contactor and extending thereabout with circumferentially spaced portions embossed in the direction of said terminals, and compression springs spaced externally of said inner switch and confined between said members, said second member being yieldably pressed toward said terminals.

ROBERT K. WINNING.